Oct. 28, 1958     D. W. LUKS ET AL     2,857,664
COATED NON-METALLIC REFRACTORY BODIES, COMPOSITION
FOR COATING SUCH BODIES, AND METHOD FOR
BONDING SUCH BODIES BY MEANS
OF SAID COMPOSITION
Filed Aug. 9, 1954
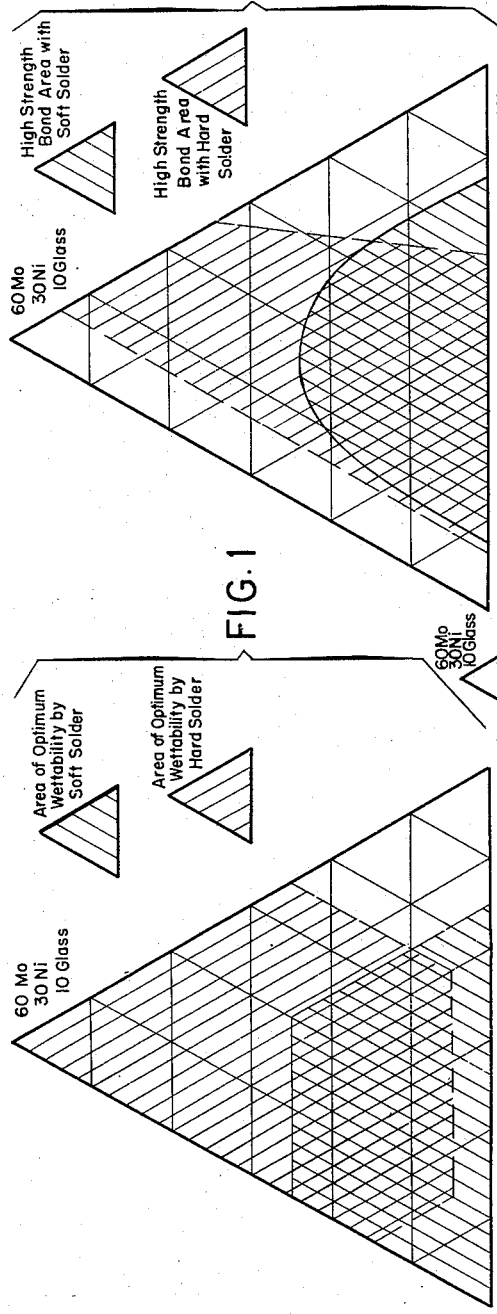
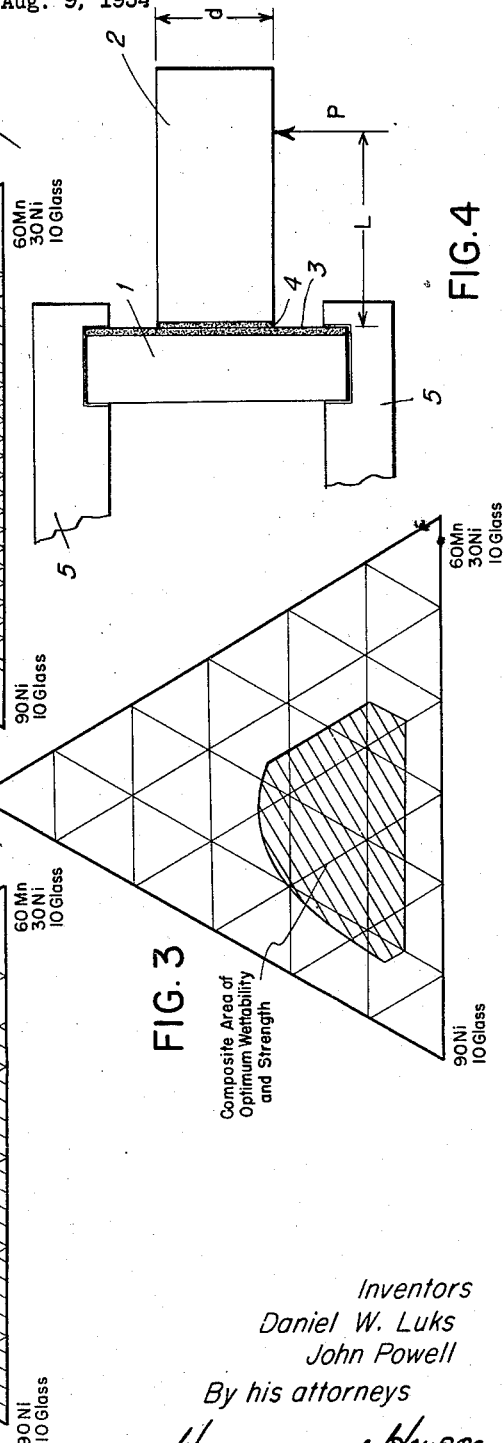
Inventors
Daniel W. Luks
John Powell
By his attorneys
Howson and Howson.

United States Patent Office 2,857,664
Patented Oct. 28, 1958

2,857,664

COATED NON-METALLIC REFRACTORY BODIES, COMPOSITION FOR COATING SUCH BODIES, AND METHOD FOR BONDING SUCH BODIES BY MEANS OF SAID COMPOSITION

Daniel W. Luks and John Powell, Frenchtown, N. J., assignors to Frenchtown Porcelain Company, Trenton, N. J., a corporation of New Jersey Application August 9, 1954, Serial No. 448,502

15 Claims. (Cl. 29—473.1)

This invention relates to coated, non-metallic, refractory bodies, particularly coated ceramic bodies, to a coating composition especially adapted for coating non-metallic refractory bodies, particularly ceramic bodies, and to a method for joining metal bodies to non-metallic, refractory bodies, and non-metallic refractory bodies to one another by means of such coating.

In many industries it is necessary to join a refractory non-metallic body, such as a ceramic or a glass body to a metal body with a firm and in many cases, vacuum-tight joint. To make such joints, the non-metallic body is customarily covered with a metallic finish to which the metallic object may be joined by soldering. In general, two types of solder are used, hard solder or soft solder. Hard solders are those of the silver-copper group and melt in the approximate range of 1000° F. and 1600° F. Soft solders are those that melt in the approximate range between about 275° F. and about 450° F.

In the past, it has not been possible to provide non-metallic refractory bodies with a single metallic coating to which both classes of solders will bond. Previous practice has been to apply a metallic base coating on the refractory and then electroplate with nickel or copper, or sometimes both, on top of the base coating to secure a surface which would be receptive to hard or to soft solder.

One object of the present invention is to provide coated non-metallic refractory bodies with which both soft and hard solder will form a strong, firmly adhering bond without expensive intermediate plating treatments.

Another object of the invention is to provide a composition suitable for forming a metallic coating on non-metallic refractory bodies which will be receptive to hard or soft soldering.

Another object of the invention is to provide a coated non-metallic refractory body which may be soldered without further treatment.

A further object of the invention is to provide a method for joining metal bodies to non-metallic refractory bodies by means of a coating susceptible to either hard or soft soldering.

A further object of the invention is to provide a method for joining non-metallic refractory bodies to other non-metallic refractory bodies by means of metallic coatings which may be hard or soft soldered to one another.

According to the invention, these and other objects are obtained through a non-metallic refractory body having a coating which comprises from about 5% to about 30% by weight of a refractory metal selected from the group consisting of molybdenum and tungsten, from about 40% to about 85% by weight of a heavy metal selected from the group consisting of nickel, cobalt, and iron, manganese in a proportion not exceeding about 35% by weight, and from about 5% to about 30% by weight glass.

Usually the manganese content will be between about 0.5 and about 35% and preferably between about 2.5% and about 35%.

In the finished product the refractory and heavy metals are present in their elemental state. The manganese is also thought to be largely present as elemental manganese. As pointed out below, however, the manganese forms a flux with the glass and in the course of flux formation small quantities of the manganese may combine with oxides present in the glass to form manganese protoxide (MnO). The extent to which protoxide formation occurs is not known precisely, and will depend on the reactivity of the glass.

The refractory and the heavy metals are preferably added as the elements.

The manganese is preferably added as elemental manganese. However, it may be added in the form of compounds of manganese, such for example as the oxides of manganese, for example, manganese dioxide ($MnO_2$). When manganese is introduced as a compound, the proportion added is such that the manganese content of the fired coating calculated as elemental manganese, will fall within the stated range.

Many different glasses or frits may be used in the present compositions. The glass should be water-insoluble and should be selected to match the coefficient of thermal expansion of the ceramic to which it is to be applied. The glass should form a flux with the manganese within the firing range set forth below (between about 1500° F. and about 2300° F.).

Glasses having these properties are readily compounded by those skilled in the art from mixtures of silica ($SiO_2$) and various combinations of the oxides of aluminum ($Al_2O_3$), boron ($B_2O_3$), sodium ($Na_2O$), potassium ($K_2O$), lithium ($Li_2O$), calcium ($CaO$), magnesium ($MgO$), barium ($BaO$), lead ($PbO$), and zinc ($ZnO$), among other elements. Some suitable glasses are listed below:

TABLE I

Glass compositions

|  | A | B | C | D | E |
|---|---|---|---|---|---|
| Potassium Oxide | 5.9 | 3.1 |  | 6.1 | 11.9 |
| Sodium Oxide | 5.9 | 7.2 |  | 1.1 | 2.1 |
| Calcium Oxide | 8.1 |  |  | 10.9 |  |
| Aluminum Oxide | 9.5 | 16.5 | 5.3 | 14.3 | 21.0 |
| Boron Oxide | 21.5 | 31.8 |  |  |  |
| Silicon Dioxide | 49.1 | 41.4 | 41.6 | 67.6 | 65.0 |
| Barium Oxide |  |  | 53.1 |  |  |

Of the two refractory metals, molybdenum or tungsten, employed in the present coatings, molybdenum is preferred.

Of the three heavy metals, nickel is the preferred ingredient, with cobalt a second choice.

The coating may be applied to the body in any convenient way, as by means of a liquid vehicle, for example, as a water paste. Preferably, however, the coating is applied as a suspension in a liquid vehicle of the metallic ingredients, the glass, and a suitable binder, preferably of organic composition. In such suspensions, the metals and glass are in finely divided form.

The suspension may be applied to the non-metallic body by any convenient method, such for example as dipping, brushing, or spraying. The freshly coated body is then fired for a period of between about 15 minutes and about 2 hours, preferably between about 30 minutes and about 1 hour in an oven at a temperature between about 1500° F. and about 2300° F., preferably between about 1650° F. and about 2050° F., in a reducing atmosphere. After firing, the body is cooled in a reducing atmosphere. It can then be soldered either to a metallic object or to another body similarly coated. Such soldering can be with soft solder or with hard solder as desired.

The invention therefore also provides a coating composition having a metallic-glass base comprising from about 5% to about 30% by weight of a refractory metal selected from the group consisting of molybdenum and tungsten, from about 40% to about 85% by weight of a heavy metal selected from the group consisting of nickel, cobalt, and iron, a manganese constituent in a proportion not exceeding about 35% by weight, calculated as elemental manganese, and from about 5% to about 30% by weight of glass; in combination with a liquid vehicle, and preferably a binder.

The invention further provides a method for joining a metal body to a refractory non-metallic body or for joining two refractory non-metallic bodies to one another which comprises coating the refractory non-metallic body or bodies with a composition as described above, firing at a temperature between about 1500° F. and about 2300° F. in a reducing atmosphere and soldering the metal body to the coated refractory non-metallic body or the coated refractory non-metallic bodies to each other by hard or soft solder.

The term "refractory non-metallic body" is used in the present application to mean a body made of a material other than metal which will not melt, decompose, or change its shape or composition under the firing temperatures involved in forming the coatings described, i. e., 1500° F. to 2300° F.

The refractory non-metallic bodies suitable for use in the present invention may be of glass, of ceramics such as porcelain, stoneware, and whiteware, of substances commonly referred to as simply "refractories," such as graphite, cordierite, steatite, silicon carbide, or alumina, or of fire brick of various types such as silica, chrome or magnesite brick. Ceramic materials may or may not be glazed before the coating is applied.

As pointed out above, the present coatings are preferably applied by means of a vehicle and a binder. Both the vehicle and the binder should be chosen so that they become completely vaporized at the firing temperature. Neither the binder nor the vehicle should leave a residue after firing. The vehicle and binder should not, of course, react with the metallic or glass components of the coating composition, either under room conditions or under firing conditions. Examples of suitable vehicles are water, benzene, the esters of fatty acids and alcohols of low molecular weight such as ethyl, butyl, and amyl acetate, ketones such as acetone and methyl-ethyl ketone (butanone), and higher ethers such as glycol diethyl ether and diethyl carbitol. Of these, we prefer to use amyl acetate or acetone.

Examples of suitable binders are methyl methacrylate, and cellulose esters and ethers such as cellulose nitrate, cellulose acetate, cellulose butyrate, methyl cellulose and ethyl cellulose. Of these, we prefer cellulose nitrate or acetate.

In preparing a suitable suspension between about ¼% and about 3% binder, preferably between about 1% and about 1½% binder, and between about 25% and about 50% preferably between about 30% and about 35% vehicle based on the weight of the entire composition, are used.

The metallic and glass ingredients are finely ground to a particle size not greater than about 8 microns and preferably between about 1 and about 4 microns.

The binder is dissolved in the vehicle and the finely divided metals and glass are added to the solution with agitation. The agitation is continued until a uniform suspension is obtained.

The term "suspension" is used here to indicate that the solid particles of glass and metal are uniformly distributed throughout the vehicle, but are not dissolved. A true colloidal suspension may be obtained, but is not necessary.

The suspension is applied to the refractory non-metallic body to be coated either by brushing, by dipping, or by spraying, and the coated body is then placed in a suitable firing device, such as an oven, in a reducing atmosphere, and fired.

The firing temperature and time will vary with the precise composition of the coating, since there is an optimum firing temperature for each composition at which the best combination of hard and soft solder wettability and bond strength are obtained. In general, the article will be fired at a temperature between about 1500° F. and about 2300° F. preferably between about 1650° F. and about 2050° F. By using a reducing atmosphere, for example, an atmosphere containing say about 15% hydrogen and about 85% nitrogen, any undesirable oxidizing impurities are removed.

After firing, the coated body is cooled in the oven in the protective atmosphere, after which it may be joined to metal objects or to other refractory non-metallic objects which have been similarly treated by either hard or soft soldering as the occasion demands.

In the drawings:

Fig. 1 is a diagram of the 10% glass layer of a tetrahedryl representation of a Mo-Ni-Mn-glass system showing the areas of optimum wettability by hard and soft solders.

Fig. 2 is a diagram of the 10% glass layer of a tetrahedryl representation of a Mo-Ni-Mn-glass system showing the areas of maximum bond strength with hard and soft solder.

Fig. 3 is a composite chart combining Figs. 1 and 2, and showing the composite area of optimum wettability and strength.

Fig. 4 is a schematic diagram showing the manner of testing a ceramic-to-ceramic bond according to the invention.

In preparing Figs. 1 to 3 of the drawings, glass of composition "A" (Table I) was used, the objects being fired at 2050° F. for 30 minutes.

Figs. 1–3 were constructed by varying the proportions of molybdenum, nickel and manganese in the four-component system, molybdenum-nickel-manganese-glass, with the glass content held at 10%. The technique used in preparing the coatings and in testing the bond strength is described in detail in the specific examples which follow.

Coatings suitable for the purposes outlined should have good wettability by both hard and soft solders and a sufficiently low flux temperature to enable them to be applied to various types of glass and ceramics.

It has been found that the refractory metals molybdenum and tungsten are important in furnishing high wettability by hard solders and that the heavy metals, nickel, cobalt, and iron are important in furnishing high wettability by soft solders and in giving a high strength bond. The roles of the refractory and heavy metals are illustrated in Figs. 1–3.

Referring to Fig. 1, it will be seen that the high hard solder wettability area lies in the high molybdenum region, whereas the high soft solder wettability area is in the high nickel region. From Fig. 2, it will be observed that a relatively high nickel content is essential for bond strength with both hard and soft solder. Adding Figs. 1 and 2 an area of high wettability and high bond strength for the 10% glass level is obtained, as shown in Fig. 3.

It will be understood that Figs. 1 to 3 represent only one plane in the tetrahedron whose apexes are 100% glass, 100% manganese, 100% nickel and 100% molybdenum. The shape of the optimum composite area will vary as the glass content changes from 5% to 30% according to the range set forth above.

The function of the glass and manganese in the present coatings is to form a flux for the heavy and refractory metals, which will operate at temperatures below the melting point of manganese alone.

The following examples illustrate the invention, but are not to be taken as limiting the invention beyond the scope of the appended claims. The proportions given in the examples are parts by weight.

EXAMPLE I

A liquid mixture was prepared by dissolving 1.56 parts of nitrocellulose (Parlodion) in 54.69 parts of amyl acetate. To this mixture were added 10 parts of a powdered glass having the composition listed in column "A" of Table I, 60 parts of powdered nickel, 10 parts of powdered molybdenum and 20 parts of powdered manganese. The powedered metals and glass had a particle size from about 1 micron to about 8 microns. The mixture was ball milled for 24 hours until the powdered materials were thoroughly dispersed to give a uniform suspension. An unglazed 79% alumina porcelain insulator was then dipped in the suspension, drained, and placed in a muffle furnace whose temperature was about 2050° F. An atmosphere consisting of 15% $H_2$ and 85% $N_2$ was maintained in the furnace. After 30 minutes, the insulator was allowed to cool to room temperature in the protective atmosphere. It had a uniform metallic coating, light grey in color. Two copper wires were soldered to the coated insulator, one with hard solder using a small acetylene flame; the other with soft solder using an electric soldering iron. In both cases the solder wetted easily and a firm bond was formed.

EXAMPLES II TO XXIX

Examples II to XXIX tabulated in Tables II and III illustrate various coating compositions and firing temperatures and show the strength of the ceramic-to-ceramic bonds which may be obtained by various compositions according to the invention.

The compositions referred to in Tables II and III were prepared in the manner described in Example I above. They were then applied to sets of the test bodies illustrated in Fig. 4. Each set of these bodies consisted of a disc 1, one inch in diameter and 5/16 inch thick, and a rod 2, one inch long and 7/16 inch in diameter.

In testing a particular composition, two sets of test bodies were used. One face of each disc 1, and one end of each rod 2, were coated with the composition as at 3 and 4. The bodies were then fired and cooled in a reducing atmosphere. After cooling, the coated surfaces of each set were soldered together, using a hard solder (72% Cu–28% Ag) for one set and soft solder (95% Sn–5% Ag) for the other set. The disc of each set was then clamped in a support 5, and a load applied to the rod perpendicular to the axes of disc and rod at a point 3/4 inch from the soldered surfaces. The load required for fracture of the bond was measured and the modulus of rupture was calculated according to the equation:

$$S = \frac{32PL}{\pi d^3}$$

where:

S is the modulus of rupture (lbs./in.$^2$),
P is the breaking force (pounds),
L is the distance in inches between the metallized face of the disc and the point at which the force P is applied, and
d is the diameter of the rod (inches).

TABLE II

*Ingredients—Parts by weight*

| Example No. | Glass Type | Glass Parts | Mn | MnO$_2$ | Mo | W | Co | Ni | Fe | Binder—1.56 Parts of— | Vehicle—54.69 Parts of— | Firing Temp., °F. |
|---|---|---|---|---|---|---|---|---|---|---|---|---|
| II | A | 5.00 | 15.00 | | | 5.00 | | 75.00 | | Cellulose Nitrate | Amyl Acetate | 2,050 |
| III | A | 20.00 | 5.00 | | | 25.00 | | 50.00 | | do | do | 2,050 |
| IV | A | 10.00 | 5.00 | | | 5.00 | 80.00 | | | do | do | 2,050 |
| V | A | 10.00 | 20.00 | | 30.00 | | 40.00 | | | do | do | 2,050 |
| VI | A | 20.00 | 10.00 | | | 30.00 | | | 40.00 | do | do | 2,050 |
| VII | A | 5.00 | 10.00 | | | 5.00 | | | 80.00 | do | do | 2,050 |
| VIII | A | 10.00 | 20.00 | | 15.00 | | | 55.00 | | do | do | 2,050 |
| IX | B | 10.00 | 20.00 | | 15.00 | | | 55.00 | | do | do | 2,050 |
| X | C | 10.00 | 20.00 | | 15.00 | | | 55.00 | | do | do | 2,050 |
| XI | D | 10.00 | 20.00 | | 15.00 | | | 55.00 | | do | do | 2,250 |
| XII | E | 10.00 | 20.00 | | 15.00 | | | 55.00 | | do | do | 2,300 |
| XIII | A | 5.00 | 20.00 | | 20.00 | | | 55.00 | | do | do | 2,050 |
| XIV | A | 5.00 | 20.00 | | 20.00 | | | 55.00 | | Cellulose Acetate | Butanone | 2,050 |
| XV | A | 5.00 | 20.00 | | 20.00 | | | 55.00 | | Methyl Methacrylate | Benzene | 2,050 |
| XVI | A | 5.00 | 20.00 | | 20.00 | | | 55.00 | | Methyl Cellulose | Water | 2,050 |
| XVII | A | 10.00 | 10.00 | | 15.00 | | | 65.00 | | Cellulose Nitrate | Amyl Acetate | 2,000 |
| XVIII | A | 10.00 | 5.00 | | 15.00 | | | 70.00 | | do | do | 2,000 |
| XIX | A | 10.00 | 2.50 | | 15.00 | | | 72.50 | | do | do | 2,000 |
| XX | A | 10.00 | 1.25 | | 15.00 | | | 73.75 | | do | do | 2,000 |
| XXI | A | 10.00 | 0.65 | | 15.00 | | | 74.35 | | do | do | 2,000 |
| XXII | A | 10.00 | | | 15.00 | | | 75.00 | | do | do | 2,000 |
| XXIII | A | 5.00 | | 0.79 | 20.00 | | | 74.50 | | do | do | 2,250 |
| XXIV | A | 5.00 | | 3.16 | 20.00 | | | 73.00 | | do | do | 2,250 |
| XXV | A | 5.00 | | 15.84 | 20.00 | | | 65.00 | | do | do | 2,250 |
| XXVI | A | 5.00 | | 34.80 | 20.00 | | | 50.00 | | do | do | 2,250 |
| XXVII | A | 5.00 | | 55.30 | 20.00 | | | 40.00 | | do | do | 2,050 |
| XXVIII | A | 5.00 | 20.00 | | 20.00 | | | 55.00 | | do | do | 1,500 |
| XXIX | A | 5.00 | 20.00 | | 20.00 | | | 55.00 | | do | do | 1,800 |

Note: In Examples II to XXVII, inclusive, the coating was applied to a 78% Alumina ceramic.
In Example XXVIII, the coating was applied to a 78% Alumina ceramic which had previously been glazed with Glass "A" and fired to maturity in an oxidizing atmosphere.
In Example XXIX, the coating was applied to a 78% Alumina ceramic which had previously been glazed with Glass "D" and fired to maturity in an oxidizing atmosphere.

TABLE III

| Example No. | Solder Wettability | | Modulus of Rupture, p. s. i. | |
| --- | --- | --- | --- | --- |
| | 95 Sn 5 Ag | 72 Cu 28 Ag | 95 Sn 5 Ag | 72 Cu 28 Ag |
| II | Good | Good | 6,380 | 5,070 |
| III | do | Fair | 8,970 | 10,130 |
| IV | Fair | Excell | 5,680 | 4,120 |
| V | Poor | Good | 4,280 | 3,890 |
| VI | Fair | Poor | 6,070 | 3,890 |
| VII | Good | Good | 6,070 | 4,670 |
| VIII | do | do | 8,570 | 5,070 |
| IX | do | do | 8,970 | 8,570 |
| X | do | do | 7,400 | 5,430 |
| XI | do | Fair | 7,550 | 6,230 |
| XII | do | do | 8,720 | 5,450 |
| XIII | do | Good | 8,410 | 7,780 |
| XIV | do | do | 8,970 | 7,020 |
| XV | do | do | 8,170 | 7,400 |
| XVI | do | Excell | 8,410 | 7,780 |
| XVII | do | Good | 8,330 | 6,230 |
| XVIII | do | do | 6,230 | 5,830 |
| XIX | do | do | 7,400 | 6,380 |
| XX | do | do | 7,400 | 5,450 |
| XXI | do | do | 4,280 | 3,890 |
| XXII | do | do | 4,280 | 3,890 |
| XXIII | Excell | do | 3,500 | 2,330 |
| XXIV | do | do | 3,500 | 3,270 |
| XXV | do | do | 6,850 | 3,890 |
| XXVI | do | do | 7,550 | 7,380 |
| XXVII | Fair | Poor | 8,170 | 4,670 |
| XXVIII | do | do | 5,070 | 4,130 |
| XXIX | Good | Good | 5,830 | 2,880 |

It will be observed that the strength of the compositions shown in the examples varies considerably. However, it will be understood that the strength demanded of a bond varies considerably with the use to which the article is to be put. Similarly, although the solder wettability of certain formulations must be regarded as poor in comparison with other formulations according to the invention, even these "poor" examples give a cheaper, more convenient technique of joining metals and non-metals of the class described, than the successive plating operations which had been necessary hitherto.

What is claimed is:

1. A new article of manufacture comprising a refractory non-metallic body having a tightly adhering coating fired thereon, said coating consisting essentially of about 5% to about 30% by weight of a refractory metal selected from the group consisting of molybdenum and tungsten, from about 40% to about 85% by weight of a heavy metal selected from the group consisting of nickel, cobalt, and iron, a manganese constituent in a proportion not exceeding about 35% by weight calculated as elemental manganese, and from about 5% to about 30% by weight glass.

2. An article of manufacture as claimed in claim 1, in which the refractory non-metallic body is a ceramic body.

3. An article of manufacture as claimed in claim 2, in which the ceramic body is a porcelain body.

4. An article of manufacture as claimed in claim 1, in which the manganese is present in an amount between about 2.5% and about 35%.

5. A coating composition for refractory non-metallic bodies which consists essentially of a metallic-glass base, said base consisting essentially of from about 5% to about 30% by weight of a powdered refractory metal selected from the group consisting of molybdenum and tungsten, from about 40% to about 85% by weight of a powdered heavy metal selected from the group consisting of nickel, cobalt, and iron, a powdered manganese constituent in a proportion, calculated as elemental manganese, not exceeding about 35% by weight, and from about 5% to about 30% by weight powdered glass capable of forming a flux with manganese at a temperature of between 1500° F. and 2300° F.; in combination with a vehicle.

6. A coating composition as claimed in claim 5, in which the vehicle is selected from the group consisting of acetone and amyl acetate.

7. A coating composition as claimed in claim 5, and including a binder.

8. A coating composition as claimed in claim 7, in which the binder is selected from the group consisting of cellulose acetate and cellulose nitrate.

9. A coating composition as claimed in claim 5, in which the manganese constituent is present in a proportion, calculated as elemental manganese, between about 2.5% and about 35% by weight of the metallic-glass base.

10. A method of joining a metallic body to a non-metallic refractory body which comprises coating said non-metallic refractory body with a composition consisting essentially of a metallic-glass base, said base consisting essentially of from about 5% to about 30% by weight of a powdered refractory metal selected from the group consisting of molybdenum and tungsten, from about 40% to about 85% by weight of a powdered heavy metal selected from the group consisting of nickel, cobalt, and iron, a powdered manganese constituent in a proportion, calculated as elemental manganese, not exceeding about 35% by weight, and from about 5% to about 30% powdered glass; in combination with a vehicle, firing said coated non-metallic, refractory body at a temperature between about 1500° F. and about 2300° F. in a reducing atmosphere to fuse said glass and form a tightly adhering coating and soldering said metallic body to said coated body.

11. A method as claimed in claim 10, wherein the solder is a hard solder.

12. A method as claimed in claim 10, wherein the solder is a soft solder.

13. A method as claimed in claim 10, wherein the manganese constituent is present in a proportion, calculated as elemental manganese, between about 2.5% and about 35% by weight of the weight of the metallic-glass base.

14. A method for joining two non-metallic refractory bodies to one another which comprises coating said bodies with a composition consisting essentially of a metallic-glass base, said base consisting essentially of from about 5% to about 30% of a powdered refractory metal selected from the group consisting of molybdenum and tungsten, from about 40% to about 85% of a powdered heavy metal selected from the group consisting of nickel, cobalt, and iron, a powdered manganese constituent in a proportion, calculated as elemental manganese, not exceeding about 35% by weight, and from about 5% to about 30% powdered glass; in combination with a vehicle, firing the coated bodies in a reducing atmosphere at a temperature between about 1500° F. and about 2300° F. to fuse said glass and form a tightly adhering coating and then soldering said coated bodies to one another.

15. A method of joining a metallic body to a non-metallic refractory body which comprises coating said non-metallic refractory body with a composition consisting essentially of a metallic-glass base, said base consisting essentially of from about 5% to about 30% by weight of a powdered refractory metal selected from the group consisting of molybdenum and tungsten, from about 40% to about 85% by weight of a powdered heavy metal selected from the group consisting of nickel, cobalt, and iron, a powdered manganese constituent in a proportion, calculated as elemental manganese, not exceeding about 35% by weight, and from about 5% to about 30% powdered glass; in combination with a binder and a vehicle, firing said coated non-metallic, refractory body at a temperature between about 1650° F. and about 2050° F. in a reducing atmosphere to fuse the glass component and form a tightly adhering coating and soldering said metallic body to said coated body.

(References on following page)

References Cited in the file of this patent

UNITED STATES PATENTS

| | | | |
|---|---|---|---|
| 2,158,845 | Ayer | May 16, | 1939 |
| 2,163,407 | Pulfrich | June 20, | 1939 |
| 2,163,408 | Pulfrich | June 20, | 1939 |
| 2,163,410 | Pulfrich | June 20, | 1939 |
| 2,250,986 | Dobke | July 29, | 1941 |
| 2,454,270 | Braunsdorff | Nov. 23, | 1948 |
| 2,647,218 | Sorg | July 28, | 1953 |
| 2,667,427 | Nolte | Jan. 26, | 1954 |
| 2,667,432 | Nolte | Jan. 26, | 1954 |
| 2,722,496 | Hosmer | Nov. 1, | 1955 |
| 2,780,561 | LaForge | Feb. 5, | 1957 |